United States Patent
Sata

(10) Patent No.: US 8,763,380 B2
(45) Date of Patent: Jul. 1, 2014

(54) CATALYST TEMPERATURE CONTROL DEVICE

(75) Inventor: Kota Sata, Susono (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 30 days.

(21) Appl. No.: 13/508,789

(22) PCT Filed: Jan. 14, 2010

(86) PCT No.: PCT/JP2010/050344
§ 371 (c)(1),
(2), (4) Date: May 9, 2012

(87) PCT Pub. No.: WO2011/086678
PCT Pub. Date: Jul. 21, 2011

(65) Prior Publication Data
US 2012/0266585 A1    Oct. 25, 2012

(51) Int. Cl.
*F01N 3/10* (2006.01)
(52) U.S. Cl.
USPC .................. 60/300; 60/277; 60/286
(58) Field of Classification Search
USPC ...................... 60/274–324
See application file for complete search history.

(56) References Cited

U.S. PATENT DOCUMENTS

| | | | |
|---|---|---|---|
| 5,307,626 A | 5/1994 | Maus et al. | |
| 5,355,671 A * | 10/1994 | Maus et al. | 60/274 |
| 6,202,406 B1 | 3/2001 | Griffin et al. | |
| 6,245,306 B1 * | 6/2001 | Miyazaki et al. | 423/215.5 |
| 7,254,940 B2 * | 8/2007 | Saitoh et al. | 60/295 |
| 7,886,521 B2 * | 2/2011 | Yokoyama et al. | 60/277 |
| 8,061,128 B2 * | 11/2011 | Crosbie | 60/295 |
| 2003/0229402 A1 | 12/2003 | Junger et al. | |
| 2007/0130919 A1 | 6/2007 | Lee | |
| 2009/0301437 A1 * | 12/2009 | Mizoguchi et al. | 123/443 |

FOREIGN PATENT DOCUMENTS

| | | |
|---|---|---|
| JP | 5 505660 | 8/1993 |
| JP | 11 324659 | 11/1999 |
| JP | 2002 227638 | 8/2002 |
| JP | 2003 195913 | 7/2003 |
| JP | 2005 171919 | 6/2005 |
| JP | 2007 16653 | 1/2007 |

(Continued)

OTHER PUBLICATIONS

International Search Report Issued Mar. 16, 2010 in PCT/JP10/50344 Filed Jan. 14, 2010.

*Primary Examiner* — Jesse Bogue
(74) *Attorney, Agent, or Firm* — Oblon, Spivak, McClelland, Maier & Neustadt, L.L.P.

(57) ABSTRACT

The present invention provides a catalyst temperature control device to control a temperature of a catalyst which influences emission performance of an internal combustion engine. A plurality of temperature measurement points are disposed continuously or dispersedly at least in a flow path direction inside the catalyst. The temperature measurement points can include actual measurement points where temperature sensors are disposed, and virtual measurement points where temperature sensors are not disposed. A control point is selected from the plurality of temperature measurement points in accordance with operation conditions of the internal combustion engine, and a target value of the temperature of the catalyst is set. A manipulated variable of the internal combustion engine is determined based on a difference between the temperature at the control point acquired by actual measurement or estimation and the target value, and the internal combustion engine is operated in accordance with the determined manipulated variable.

4 Claims, 3 Drawing Sheets

(56) References Cited

FOREIGN PATENT DOCUMENTS

| JP | 2007 162634 | 6/2007 |
|----|-------------|--------|
| JP | 2007 239472 | 9/2007 |
| JP | 2008 106713 | 5/2008 |
| JP | 2006 266220 | 10/2008 |
| WO | WO 2007091721 A1 * | 8/2007 |

* cited by examiner (A)

(B)

(C)

though the catalyst temperature rises to a temperature at which a sufficient reaction rate for purifying emission can be obtained at an inlet port side of the catalyst. In reality, a temperature difference between the inlet port side and the outlet port side of the catalyst sometimes reaches 500° C. or more depending on operation conditions of the internal combustion engine.

CATALYST TEMPERATURE CONTROL DEVICE

TECHNICAL FIELD

The present invention relates to a catalyst temperature control device that controls a temperature of a catalyst which is disposed in an exhaust passage of an internal combustion engine.

BACKGROUND ART

Among various performances which are required of internal combustion engines for automobiles, an emission performance is one of the performances especially considered to be important today. It is a catalyst which is disposed in an exhaust passage, and more particularly, temperature control of the catalyst that influences the emission performance. Purifying performance of the catalyst significantly depends on its temperature. Therefore, various inventions relating to temperature control of a catalyst have been conventionally made. As the literatures that disclose such inventions, for example, Japanese Patent Laid-Open No. 2005-171919, Japanese Patent Laid-Open No. 2008-106713, Japanese patent Laid-Open No. 2007-162634 and Japanese patent Laid-Open No. 2003-195913 can be cited.

Incidentally, the temperature in the catalyst during operation of the internal combustion engine is not always uniform. FIGS. 6A, 6B and 6C show an example of a temperature distribution which occurs in the catalyst. FIG. 6B shows the temperature distribution in a I-I direction, that is, a flow path direction of the catalyst in a schematic diagram of FIG. 6A in graphical form. FIG. 6C shows the temperature distribution in a II-II direction, that is, a diameter direction of the catalyst in the schematic diagram of FIG. 6A in graphical form. Directly after start of the internal combustion engine, a carrier itself of the catalyst is cooled, and therefore, the temperature distribution in the flow path direction becomes especially remarkable. Therefore, the catalyst temperature sometimes does not rise so much at an outlet port side of the catalyst even though the catalyst temperature rises to a temperature at which a sufficient reaction rate for purifying emission can be obtained at an inlet port side of the catalyst. In reality, a temperature difference between the inlet port side and the outlet port side of the catalyst sometimes reaches 500° C. or more depending on operation conditions of the internal combustion engine.

It has been a well-known fact for a long time that the temperature distribution as above occurs in the catalyst. Therefore, the conventional inventions relating to temperature control of catalysts include the inventions which perform temperature control in consideration of the temperature distributions in catalysts. For example, in the invention disclosed in Japanese Patent Laid-Open No. 2005-171919, the temperature difference between a front end and a rear end of a catalyst is obtained, and a flow rate of secondary air which is supplied to an exhaust system is regulated so that the temperature difference has a value within a predetermined range.

However, many inventions which have been conventionally proposed are made from the viewpoint of how the temperature distribution in the catalyst is reduced. In enhancing the emission performance of the internal combustion engine, it is important how efficiently the entire catalyst is used, but the invention which deals with the temperature distribution in the catalyst from the viewpoint like this is not found at present.

SUMMARY OF INVENTION

The present invention is made in view of the problem as described above. An object of the invention is to provide a catalyst temperature control device which can properly control a temperature of a catalyst which influences an emission performance of an internal combustion engine by using the entire catalyst extremely efficiently.

In the object as above, according to one mode of the present invention, a catalyst temperature control device includes means that stores a plurality of temperature measurement points disposed continuously or dispersedly at least in a flow path direction inside the catalyst. Further, the catalyst temperature control device includes means that selects a control point from the plurality of temperature measurement points in accordance with operation conditions of the internal combustion engine, and means that sets a target value of the temperature of the catalyst in accordance with the operation conditions of the internal combustion engine. Further, the catalyst temperature control device includes means that acquires a temperature at the selected control point, means that determines a manipulated variable of the internal combustion engine based on a difference between an acquired temperature at the control point and the target value, and means that operates the internal combustion engine in accordance with the determined manipulated variable.

According to the catalyst temperature control device of the mode as above, the control point of the catalyst temperature control is changed in response to the operation conditions of the internal combustion engine, and therefore, the entire catalyst can be efficiently used.

As a more preferable mode, the temperature measurement points also can be continuously or dispersedly disposed in a diameter direction of the catalyst. Alternatively, the temperature measurement points also can be continuously or dispersedly disposed in a circumferential direction of the catalyst.

The temperature measurement points can include actual measurement points where temperature sensors are disposed, and virtual measurement points where temperature sensors are not disposed. The temperature at the control point can be actually measured by the temperature sensor when the control point is the actual measurement point. Meanwhile, when the control point is the virtual measurement point, the temperature at the control point can be estimated by interpolation calculation using a temperature or temperatures at one or a plurality of actual measurement points near the control point.

As one preferable selection of the control point in accordance with the operation conditions of the internal combustion engine, moving the control point from an inlet port side of the catalyst to an outlet port side in response to a time from start of the internal combustion engine is cited. According to this, at the time of start of the internal combustion engine, the entire catalyst can be quickly and reliably activated.

DESCRIPTION OF EMBODIMENTS

An embodiment of the present invention will be described with reference to each of the drawings of FIGS. 1 to 5.

Figure 1:
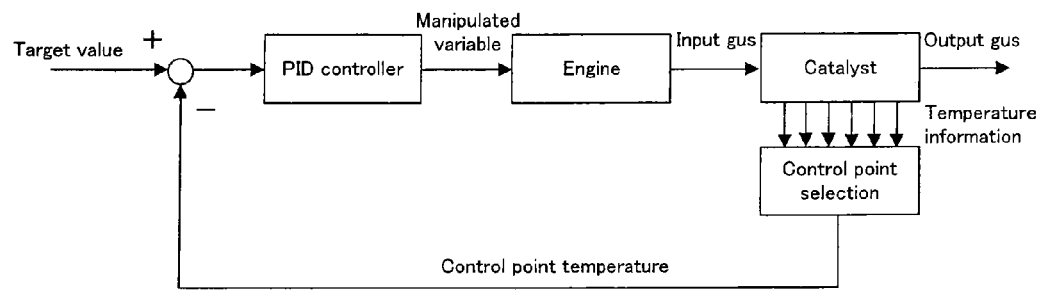
FIG. 1 is a diagram showing a configuration of a catalyst temperature control device of an embodiment of the present invention.

FIG. 1 is a diagram showing a configuration of a catalyst temperature control device of the present embodiment. The catalyst temperature control device is configured as a feedback control system which operates an internal combustion engine so that a catalyst temperature which is a controlled variable becomes a target value thereof. In the present embodiment, a PID controller is included as means which determines a manipulated variable of the internal combustion engine.

One of the characteristics of the catalyst temperature control device of the present embodiment is having a plurality of temperature measurement points, where the catalyst temperature which is a controlled variable is measured, in the catalyst. In more detail, the temperature measurement points are continuously or dispersedly disposed in a flow path direction inside the catalyst. Some of them are actual measurement points where temperature sensors are actually disposed, and the remaining measurement points are virtual measurement points where temperature sensors are not disposed. The positions of the actual measurement points are fixed, whereas the positions of the virtual measurement points are not fixed, but can be optionally changed. Further, the virtual measurement points can be optionally added and deleted. The positions and the actual/virtual types of these temperature measurement points are stored in the catalyst temperature control device. Another characteristic of the catalyst temperature control device of the present embodiment is that one control point is selected from a plurality of temperature measurement points in accordance with the operation conditions of the internal combustion engine. The catalyst control device calculates the manipulated variable of the internal combustion engine by the PID controller so that the temperature at the selected control point becomes a target value thereof.

Figure 2:
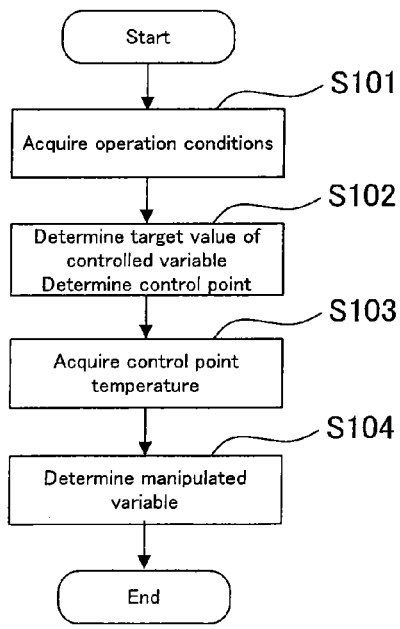
FIG. 2 is a flowchart showing a procedure of catalyst temperature control executed in the embodiment of the present invention.
Figure 3:
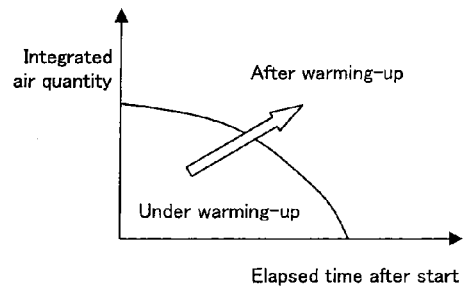
FIG. 3 is a diagram for explaining operation conditions of a internal combustion engine which are used in the catalyst temperature control.

When a procedure of the catalyst temperature control according to the catalyst temperature control device of the present embodiment is shown in a flowchart, it is as in FIG. 2. In a first step S101, operation conditions of the internal combustion engine are acquired. The operation conditions are the conditions which influence the temperature of the catalyst, and, for example, an engine speed and a throttle opening are included therein. Further, in the case of directly after start of the internal combustion engine, the operation conditions to be acquired include an elapsed time after the start and an integrated air quantity after the start. As shown in FIG. 3, it can be determined whether the catalyst is under warming-up, or warming-up of the catalyst is completed, from a relationship of the elapsed time and the integrated air quantity after start.

Figure 4:
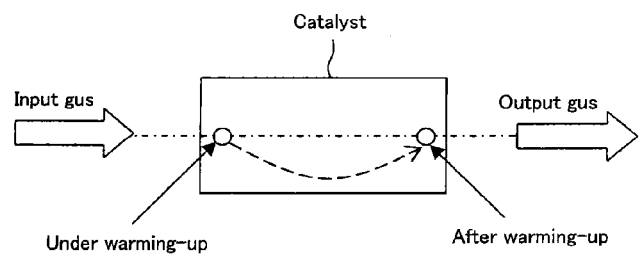
FIG. 4 is a diagram for explaining a method of selecting a control point by the catalyst temperature control executed at the time of start of the internal combustion engine.

In a next step S102, the target value of the catalyst temperature is set in accordance with the operation conditions acquired in step S101. Further, the temperature measurement points to be the control points are selected in accordance with the operation conditions. The selection is performed by using a map and an evaluation function with the operation conditions used as arguments. FIG. 4 shows the method for selection of the control point at the time of start of the internal combustion engine, as one example of the method for selection of the control point by the catalyst temperature control. According to FIG. 4, when it is determined that the catalyst is under warming-up, the temperature measurement point located in a front end portion (inlet port side) of the catalyst is selected as the control point. When it is determined that warming-up of the catalyst is completed, the control point is changed to the temperature measurement point located in a rear end portion (outlet port side) of the catalyst. By changing selection of the control point in accordance with the warming-up state of the catalyst like this, the entire catalyst can be activated quickly and reliably.

Figure 5:
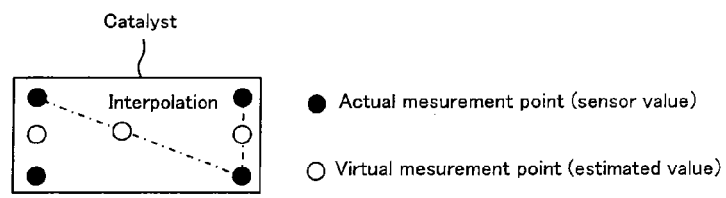
FIG. 5 is a diagram for explaining a method of acquiring a temperature at the control point.
Figure 6A:
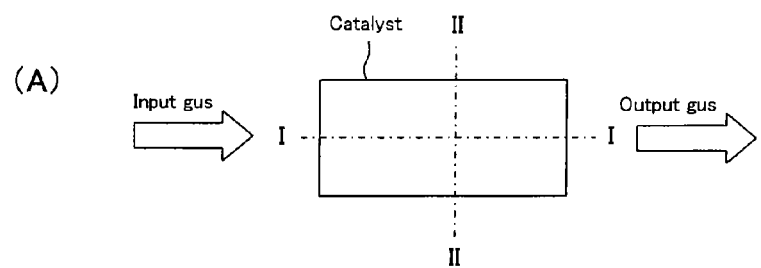
FIG. 6A is a diagram for explaining a temperature distribution in a catalyst.
Figure 6B:
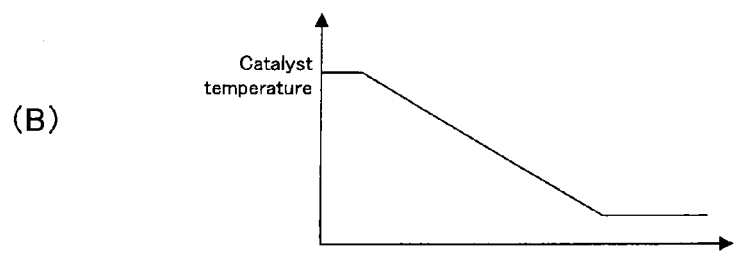
FIG. 6B is a diagram showing graphically a temperature distribution in a flow path direction in the catalyst.
Figure 6C:
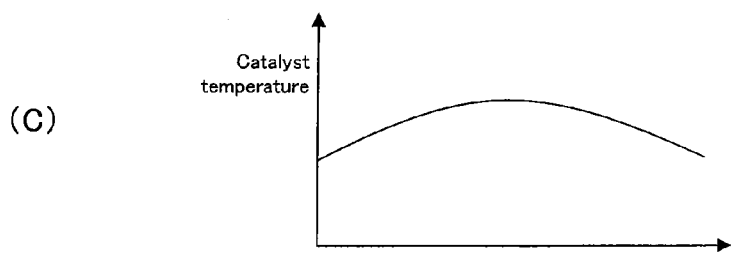
FIG. 6C is a diagram showing graphically a temperature distribution in a diameter direction in the catalyst.

In the next step S103, the temperature at the control point selected in step S102 is acquired. The acquiring method of the temperature at the control point differs according to the type of the temperature measurement point selected as the control point. As shown in FIG. 5, the temperature measurement points selected as the control point in the catalyst include actual measurement points (shown by the black circles) where the temperature sensors are disposed, and virtual measurement points (shown by white circles) where the temperature sensors are not disposed. The actual measurement points are fixed, but the positions of the virtual measurement points can be optionally changed, and the virtual measurement points can be newly added. When the control point selected in step S102 is the actual measurement point, the temperature actually measured by the temperature sensor is directly acquired as the temperature at the control point. Meanwhile, when the virtual measurement point is selected as the control point, the temperature at the control point is estimated by interpolation calculation using the temperature or temperatures of one or a plurality of actual measurement points near the control point.

In a last step S104, the manipulated variable of the internal combustion engine is determined based on a difference between the temperature at the control point acquired in step S103 and the target value set in step S102. In the present embodiment, the manipulated variable is determined by PID control by the PID controller. As the manipulated variables which can be used in temperature control of the catalyst, for example, an ignition time, a secondary air quantity, a fuel injection time, valve timing, an EGR amount and the like are cited. An electronic control unit which controls operation of the internal combustion engine operates the internal combustion engine in accordance with the manipulated variables determined by PID control.

The embodiment of the present invention has been described above, but the present invention is not limited to the aforementioned embodiment, and can be carried out by being variously modified within the range without departing from the gist of the present invention. For example, the present invention may be carried out by being modified as follows.

In FIG. 4, the control point is switched from the front end portion of the catalyst to the rear end portion, and the control point may be moved continuously or stepwise from the inlet port side of the catalyst to the outlet port side. The position of the control point in this case is preferably determined in response to the elapsed time from start of the internal combustion engine.

Further, in FIG. 4, the number of control points which are selected is one, but a plurality of control points can be selected, and temperature control can be performed based on the temperature at them.

The temperature measurement points disposed in the catalyst may be also continuously or dispersedly disposed in a diameter direction of the catalyst in addition to the flow path direction. Further, the temperature measurement points may be also continuously or dispersedly disposed in a circumferential direction of the catalyst. According to them, temperature control of the catalyst in consideration of the temperature distributions in the diameter direction and the circumferential direction in the catalyst is enabled. For example, at the time of operation of the internal combustion engine, a flow velocity distribution of gas by a boundary layer occurs in the catalyst, and the flow velocity distribution of gas significantly influences the temperature distributions in the diameter direction and the circumferential direction. Further, the flow velocity distributions of gas in the diameter direction and the circumferential direction can be controlled by the flow velocity of gas which flows into the catalyst. According to these, it is conceivable that the temperature distribution in the catalyst can be controlled by changing the flow velocity of the gas which flows into the catalyst.

Further, the position of the temperature sensor may be moved by an actuator. In this case, each of the positions in the moving range of the temperature sensor is the temperature measurement point. By moving the position of the temperature sensor, the temperature measurement point to be the control point is selected.

The invention claimed is:

1. A catalyst temperature control device controlling a temperature of a catalyst disposed in an exhaust passage of an internal combustion engine, comprising:
    a data storage that stores a plurality of temperature measurement points which are disposed continuously or dispersedly at least in a flow path direction inside the catalyst, and include actual measurements points where temperature sensors are disposed, and virtual measurement points where temperature sensors are not disposed;
    a calculator that is programmed to:
    select a control point from the plurality of temperature measurement points in accordance with operation conditions of the internal combustion engine;
    set a target value of the temperature of the catalyst in accordance with the operation conditions of the internal combustion engine;
    actually measure the temperature at the control point by the temperature sensor, when the control point is the actual measurement point;
    estimate the temperature at the control point by interpolation calculation using temperatures at a plurality of actual measurement points near the control point, when the control point is the virtual measurement point; and
    determine a manipulated variable of the internal combustion engine based on a difference between the measured or estimated temperature at the control point and the target value; and
    an operating device that operates the internal combustion engine in accordance with the manipulated variable,
    wherein the temperature measurement points are also continuously or dispersedly disposed in a diameter direction of the catalyst.

2. The catalyst temperature control device according to claim 1,
    wherein the calculator is programmed to move the control point from an inlet port side of the catalyst to an outlet port side in response to a time from start of the internal combustion engine.

3. A catalyst temperature control device controlling a temperature of a catalyst disposed in an exhaust passage of an internal combustion engine, comprising:
    a data storage that stores a plurality of temperature measurement points which are disposed continuously or dispersedly at least in a flow path direction inside the catalyst, and include actual measurement points where temperature sensors are disposed, and virtual measurement points where temperature sensors are not disposed;
    a calculator that is programmed to:
    select a control point from the plurality of temperature measurement points in accordance with operation conditions of the internal combustion engine;
    set a target value of the temperature of the catalyst in accordance with the operation conditions of the internal combustion engine;
    actually measure the temperature at the control point by the temperature sensor, when the control point is the actual measurement point;
    estimate the temperature at the control point by interpolation calculation using temperatures at a plurality of actual measurement points near the control point, when the control point is the virtual measurement point; and
    determine a manipulated variable of the internal combustion engine based on a difference between the measured or estimated temperature at the control point and the target value; and
    an operating device that operates the internal combustion engine in accordance with the manipulated variable,
    wherein the temperature measurement points are also continuously or dispersedly disposed in a circumferential direction of the catalyst.

4. The catalyst temperature control device according to claim 3,
    wherein the calculator is programmed to move the control point from an inlet port side of the catalyst to an outlet port side in response to a time from start of the internal combustion engine.

* * * * *